(12) United States Patent
Ulrey et al.

(10) Patent No.: US 8,374,742 B2
(45) Date of Patent: Feb. 12, 2013

(54) TURBOCHARGER LAUNCH CONTROL

(75) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 13/234,348

(22) Filed: Sep. 16, 2011

(65) Prior Publication Data
US 2012/0029749 A1  Feb. 2, 2012

(51) Int. Cl.
*B60L 9/00* (2006.01)
(52) U.S. Cl. ........... 701/22; 701/102; 180/65; 180/265
(58) Field of Classification Search ............ 701/22, 701/102; 180/65.265, 65, 265
See application file for complete search history.

(56) References Cited

U.S. PATENT DOCUMENTS

| | | | |
|---|---|---|---|
| 6,233,935 B1 | 5/2001 | Kahlon et al. | |
| 6,754,579 B2 | 6/2004 | Kamiya et al. | |
| RE38,671 E * | 12/2004 | Kahlon et al. | 60/605.1 |
| 7,216,479 B2 | 5/2007 | Tamura | |
| 7,777,796 B2 | 8/2010 | Inoue et al. | |
| 2003/0106541 A1 | 6/2003 | Dixon et al. | |
| 2009/0107455 A1 | 4/2009 | Pallett et al. | |
| 2009/0276130 A1* | 11/2009 | Whitney et al. | 701/68 |
| 2009/0291803 A1 | 11/2009 | Moeller | |
| 2011/0023480 A1* | 2/2011 | Chyo | 60/602 |
| 2011/0144884 A1* | 6/2011 | Miah | 701/102 |

FOREIGN PATENT DOCUMENTS
EP  0 990 793 A3  9/2000

* cited by examiner

*Primary Examiner* — John Q Nguyen
*Assistant Examiner* — Jordan S Fei
(74) *Attorney, Agent, or Firm* — Julia Voutyras; Alleman Hall McCoy Russell & Tuttle LLP (57) ABSTRACT

A method for launching a vehicle is disclosed. The method comprises, during operation with an idle engine speed prior to a pedal tip-in, increasing alternator and boost pressure while maintaining the idle engine speed, and decreasing alternator load responsive to the pedal tip-in. In this way, increased turbocharger output may be used to quickly accelerate the vehicle.

19 Claims, 6 Drawing Sheets

TURBOCHARGER LAUNCH CONTROL

FIELD

The present disclosure relates to a system and method for improving vehicle launch with an engine including a turbocharger.

BACKGROUND AND SUMMARY

Turbo charging an engine allows the engine to provide power similar to that of a larger displacement engine while engine pumping work is maintained near the pumping work of a normally aspirated engine of similar displacement. Thus, turbo charging can extend the operating region of an engine. Turbochargers function by compressing intake air via a turbine operated by exhaust gas flow. During vehicle launch conditions, such as when accelerating from idle, minimal exhaust gas flow combined with increased load on the compressor results in a delay of the throttle response, referred to as turbo lag, leading to reduced engine power output.

One example approach to reducing turbo lag is described by Dixon et. al. in U.S. 2003/01106541. Therein, the likelihood that engine torque will need to be boosted is estimated based on engine operating parameters, and an idle speed of the compressor is controlled as a function of the torque boost likelihood.

However, the inventors herein have identified potential issues with the above approach. Controlling the idle speed of the compressor requires a separate motor to power the compressor. Operation of the motor reduces engine efficiency, thus wasting fuel, and requires extra engine packaging space.

Thus, in one example, some of the above issues may be at least partly addressed by a vehicle launch method. The method comprises, at idle before pedal tip-in, increasing alternator load and boost pressure while maintaining idle speed, and responsive to pedal tip-in, decreasing alternator load.

In this way, before vehicle launch initiated by a pedal tip-in, the vehicle can be "pre-boosted," or operated to increase boost to increase engine power output during the launch. In one example, the pre-boosting includes placing a maximum load on the alternator and retarding spark timing. In some embodiments, pre-boosting may also include adjusting intake valve timing to best volumetric efficiency. By doing so, the engine air flow rate may be increased and the extra energy may be routed to the exhaust via the retarded spark timing and/or the extra energy may be sent to electrical storage via the alternator. Exhaust output will thus increase, resulting in increased turbine spinning and increased boost. Further, the load on the alternator may be reduced or completely unloaded and spark timing may be advanced during the vehicle launch in order to increase acceleration torque.

The present disclosure provides several advantages. By both pre-boosting the engine and decreasing alternator load at vehicle launch, turbo lag can be reduced. By reducing turbo lag without the inclusion of an additional motor to power the turbine or compressor, engine efficiency can be improved. Additionally, in hybrid vehicles, the extra energy stored as a result of increasing the load on the alternator may be discharged during or following the vehicle launch and used to power the motor, further increasing engine efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
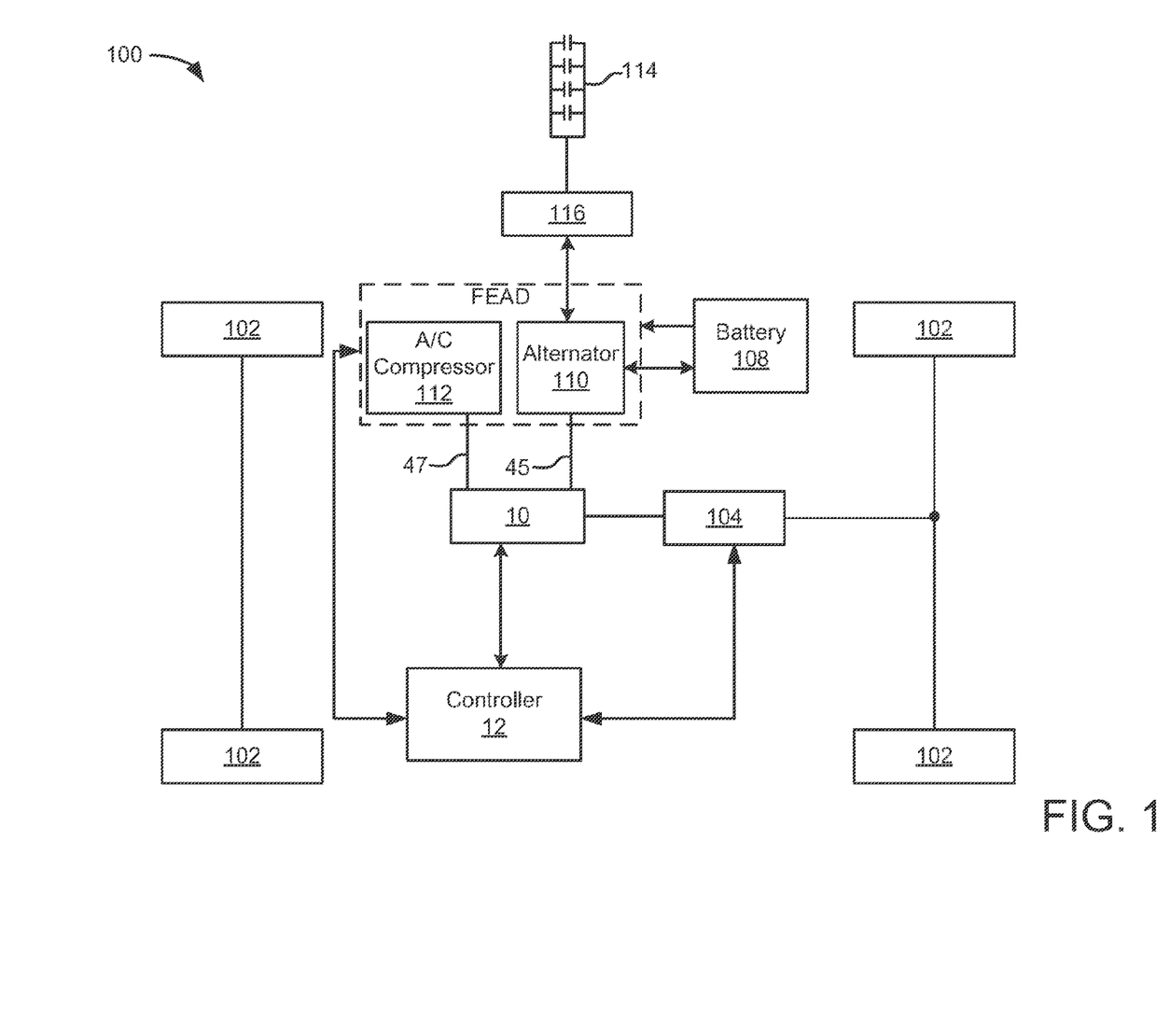
FIG. 1 shows a schematic diagram of a vehicle.
Figure 2:
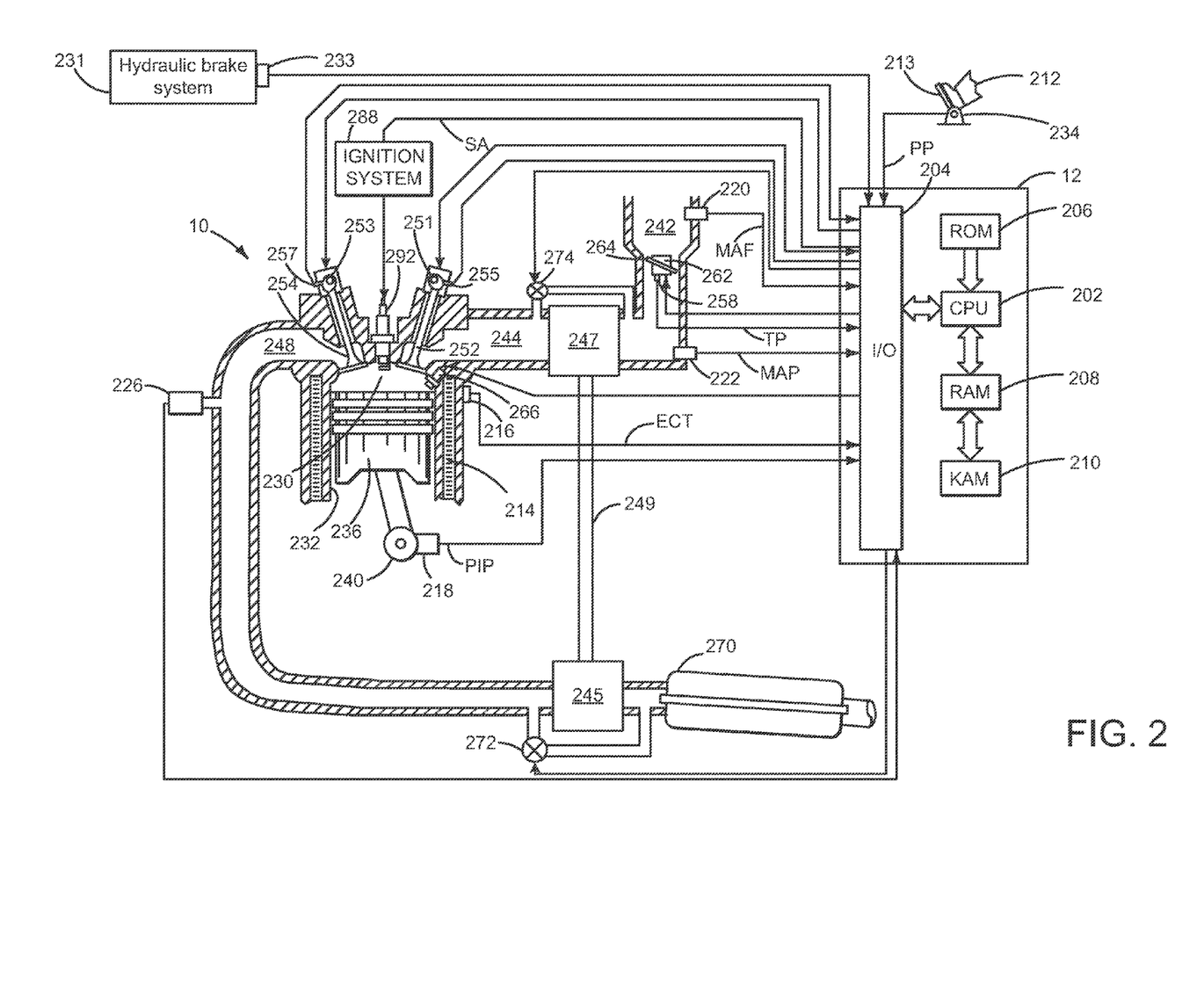
FIG. 2 shows a schematic diagram of an engine.

The present description is related to boosting a vehicle. In one non-limiting example, the vehicle may be configured as illustrated in FIG. 1. Further, an engine as shown in FIG. 2 may be part of the vehicle. The engine and alternator of the vehicle may be controlled according to the methods of FIGS. 3 and 4 in order to produce the engine operating parameters depicted in FIGS. 5A and 5B.

Referring now to FIG. 1, vehicle 100 includes wheels 102. Torque is supplied to wheels 102 via engine 10 and transmission 104. In some examples, an electric motor or hydraulic motor may also provide torque to wheels 102. Front end accessory drive (FEAD) 120 includes alternator 110 and air conditioning (A/C) compressor 112. Alternator 110 and A/C compressor 112 may each be mechanically coupled to engine 10 via shaft or pulley 45, 47, or may be mechanically coupled to engine 10 via a common shaft or pulley. Battery 108 and alternator 110 may provide electrical power to various engine accessory components not shown in FIG. 1. Alternator 110 may be coupled to capacitor bank 114 via an electronic interface 116 in order to store excess charge built up during various operating modes of the engine. Capacitor bank 114 may comprise one or more capacitors arranged in parallel that receive and discharge charge from alternator 110. In other embodiments, capacitor bank 114 may include one or more capacitors arranged in series. Capacitor bank 114 may receive change from alternator 110 in parallel, and discharge the charge in series. In one embodiment, capacitor bank 114 may charge and discharge voltage at a fixed voltage, such as 6, 12, or 24 volts, but in other embodiments may be configured to charge and discharge at fixed or variable voltages other than 6, 12, or 24 volts.

In the embodiment depicted, capacitor bank 114 comprises only capacitors. However, in some embodiments, capacitor bank 114 may comprise a battery/capacitor network, while in other embodiments, a battery bank may be utilized in place of capacitor bank 114. Controller 12 includes instructions for controlling and receiving inputs from alternator 110, A/C compressor 112, engine 10, and transmission 104.

Referring to FIG. 2, internal combustion engine 10, comprising a plurality of cylinders, one cylinder of which is shown in FIG. 2, is controlled by electronic engine controller 12. Engine 10 includes combustion chamber 230 and cylinder walls 232 with piston 236 positioned therein and connected to crankshaft 240. Combustion chamber 230 is shown communicating with intake manifold 244 and exhaust manifold 248 via respective intake valve 252 and exhaust valve 254. Each intake and exhaust valve may be operated by an intake cam 251 and an exhaust cam 253. Alternatively, one or more of the intake and exhaust valves may be operated by an electromechanically controlled valve coil and armature assembly. The position of intake cam 251 may be determined by intake cam sensor 255. The position of exhaust cam 253 may be determined by exhaust cam sensor 257.

Fuel injector 266 is shown positioned to inject fuel directly into cylinder 230, which is known to those skilled in the art as direct injection. Alternatively, fuel may be injected to an intake port, which is known to those skilled in the art as port injection. Fuel injector 266 delivers liquid fuel in proportion to the pulse width of a signal from controller 12. Fuel is delivered to fuel injector 266 by a fuel system (not shown) including a fuel tank, fuel pump, and fuel rail (not shown). In addition, intake manifold 244 is shown communicating with optional electronic throttle 262 which adjusts a position of throttle plate 264 to control air flow from air intake 242 to intake manifold 244. In one example, a low pressure direct injection system may be used, where fuel pressure can be raised to approximately 20-30 bar. Alternatively, a high pressure, dual stage, fuel system may be used to generate higher fuel pressures.

Distributorless ignition system 288 provides an ignition spark to combustion chamber 230 via spark plug 292 in response to controller 12. Universal Exhaust Gas Oxygen (UEGO) sensor 226 is shown coupled to exhaust manifold 248 upstream of catalytic converter 270. Alternatively, a two-state exhaust gas oxygen sensor may be substituted for UEGO sensor 226.

Engine 10 may further include a compression device such as a turbocharger or supercharger including at least a compressor 247 arranged upstream of intake manifold 244. For a turbocharger, compressor 247 may be at least partially driven by a turbine 245 (e.g., via a shaft 249) arranged along exhaust passage 248. For a supercharger, compressor 247 may be at least partially driven by the engine and/or an electric machine, and may not include a turbine. Thus, the amount of compression provided to one or more cylinders of the engine via a turbocharger or supercharger may be varied by controller 12 and further by adjusting one or more of a wastegate 272 and/or compressor bypass valve 274. A charge air cooler (not shown) may be included downstream from compressor 247 and upstream of intake valve 252. Charge air cooler may be configured to cool gases that have been heated by compression via compressor 247, for example.

Converter 270 can include multiple catalyst bricks, in one example. In another example, multiple emission control devices, each with multiple bricks, can be used. Converter 270 can be a three-way type catalyst in one example.

Controller 12 is shown in FIG. 2 as a conventional microcomputer including: microprocessor unit 202, input/output ports 204, read-only memory 206, random access memory 208, keep alive memory 210, and a conventional data bus. Controller 12 is shown receiving various signals from sensors coupled to engine 10, in addition to those signals previously discussed, including: engine coolant temperature (ECT) from temperature sensor 216 coupled to cooling sleeve 214; a position sensor 234 coupled to an accelerator pedal 213 for sensing force applied by foot 212; a hydraulic brake pressure signal from sensor 233 coupled to hydraulic brake system 231; a measurement of engine manifold pressure (MAP) from pressure sensor 222 coupled to intake manifold 244; an engine position sensor from a Hall effect sensor 218 sensing crankshaft 240 position; a measurement of air mass entering the engine from sensor 220; and a measurement of throttle position from sensor 258. Barometric pressure may also be sensed (sensor not shown) for processing by controller 12. In a preferred aspect of the present description, engine position sensor 218 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 230 via intake manifold 244, and piston 236 moves to the bottom of the cylinder so as to increase the volume within combustion chamber 230. The position at which piston 236 is near the bottom of the cylinder and at the end of its stroke (e.g. when combustion chamber 230 is at its largest volume) is typically referred to by those of skill in the art as bottom dead center (BDC). During the compression stroke, intake valve 252 and exhaust valve 254 are closed. Piston 236 moves toward the cylinder head so as to compress the air within combustion chamber 230. The point at which piston 236 is at the end of its stroke and closest to the cylinder head (e.g. when combustion chamber 230 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 292, resulting in combustion. During the expansion stroke, the expanding gases push piston 236 back to BDC. Crankshaft 240 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is shown merely as an example, and that intake and exhaust valve opening and/or closing timings may vary, such as to provide positive or negative valve overlap, late intake valve closing, or various other examples.

Figure 3:
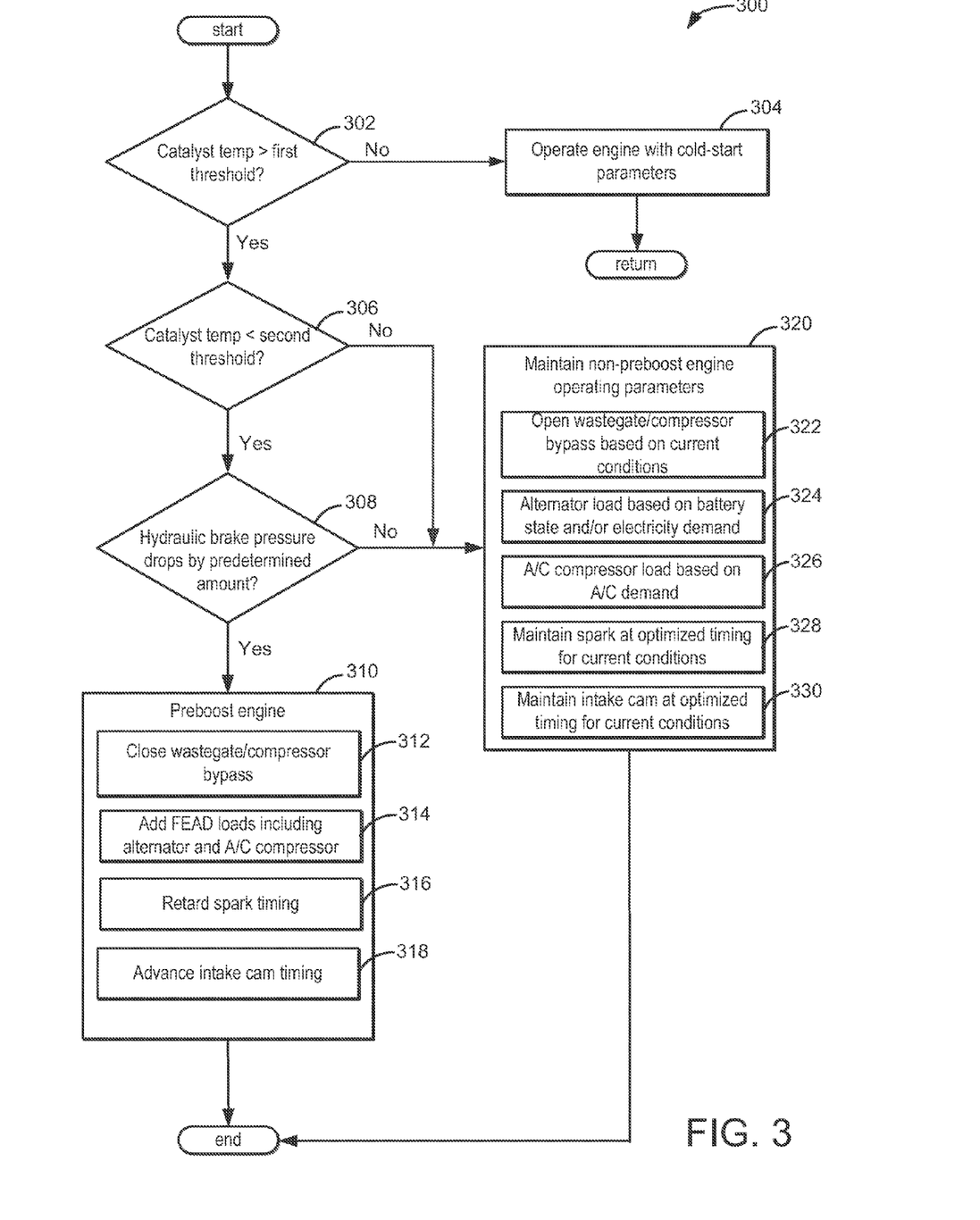
FIG. 3 shows a flow chart illustrating an example method for pre-boosting an engine according to an embodiment of the present disclosure.

Turning to FIG. 3, a method 300 for pre-boosting an engine according to an embodiment of the disclosure is depicted. Method 300 may be carried out by controller 12 in response to signals received from various sensors, such as hydraulic brake pressure sensor 233. Method 300 comprises, at 302, determining if catalyst temperature is above a first threshold. The first catalyst temperature threshold may be any suitable temperature below which the catalyst may not be active. If the catalyst temperature is below the first threshold, the engine may be operating under cold start conditions and thus may operate with cold start parameters at 304. Cold start operating parameters may include directing exhaust output to the catalyst in order to heat the catalyst, and may include adjusting intake cam timing to the best volumetric efficiency position, retarding spark timing, operating at rich air-fuel ratios, etc.

If catalyst temperature is above the first threshold, method 300 proceeds to 306 to determine if catalyst temperature is below a second threshold. The second catalyst temperature threshold may be any suitable temperature above which the catalyst may experience reduced activity and/or damage. If the catalyst temperature is not below the second threshold, method 300 proceeds to 320 to maintain non-pre boost operating parameters. As the pre-boost conditions may increase catalyst temperature, if the catalyst temperature is already relatively high, the catalyst may experience damage during the pre-boost, and thus the engine may not be pre-boosted when catalyst temperature is above the threshold.

If catalyst temperature is below the second threshold, method 300 proceeds to 308 to determine if hydraulic brake pressure has dropped by a threshold amount. For example, when a vehicle operator releases the brake pedal, the hydraulic brake pressure will drop. Detecting change in hydraulic brake pressure rather than change in brake pedal position enables a more rapid detection of change in brake status. The drop in pressure threshold amount may be any suitable amount that indicates the operator intends to fully release the brake pedal. In one embodiment, the threshold amount may be a drop of 50%, or it may be a drop of a suitable amount over a particular time period.

If it is determined at 308 that hydraulic brake pressure has dropped by a threshold amount, method 300 proceeds to 310 to enable the pre-boost operation. The drop in hydraulic brake pressure may indicate the operator has released the brake pedal in order to accelerate and enable vehicle movement. In turbocharged engines, acceleration following idle conditions (such as when a vehicle starts to move following a stop at a stoplight) can often result in an acceleration lag due to the lack of exhaust output to spin the turbine of the turbocharger. The pre-boost is enabled following brake pedal release in order to generate extra exhaust output to spin the turbine, and increase acceleration torque for a subsequent vehicle launch. In order to generate increased turbine spinning, airflow through the engine may be increased. Thus, more exhaust flow will occur, and the turbine can spin with increased speed, driving the compressor to compress the increased airflow into the engine. However, as the pre-boost is performed in response to an operator releasing the brake pedal and before the engine is launched, inadvertent acceleration as a result of the increased airflow may occur. To avoid this, a number of operations are performed during the pre-boost mode to control engine speed. Thus, the pre-boost includes a variety of actions to increase boost while controlling engine speed. Further, the pre-boost includes actions to optimize a subsequent vehicle launch.

Enabling the pre-boost includes closing a wastegate and compressor bypass valve (CBV) at 312. When open, the wastegate allows exhaust to bypass the turbine, and the CBV allows intake air to bypass the compressor. Both the wastegate and CBV can be controlled to modulate the amount of boost provided to the engine. By closing the wastegate, more exhaust will be funneled to the turbine to maximize turbine output. Further, by closing the CBV, throttle inlet pressure can be increased. The wastegate may have a set point based on engine speed and load, for example. During the pre-boost, this set point may be adjusted to increase boost pressure. Under some conditions, the wastegate and/or CBV may be fully closed, while under other conditions, the wastegate and/or CBV may be left partially open to direct most of the exhaust power to the turbocharger while allowing some exhaust and/or intake air to bypass the turbocharger.

Increased load may be placed on one or more front end accessory drive (FEAD) components at 314. By increasing the load to the FEAD, engine speed can be controlled. For example, the A/C compressor may be operated such that compressor head pressure is at a maximum safe pressure. Additionally, the alternator may be operated at increased load by increasing the alternator charging voltage, for example by adjusting the alternator field. In one embodiment, the alternator load may be increased to maximum alternator load. In other embodiment, the degree of increase in the alternator load may be adjusted based on various conditions, such as the exhaust gas temperature, the boost level before increasing the alternator load, and others. For example, if the boost level before increasing the alternator load is at or above atmospheric pressure, less alternator load may be added. Further, as the load placed on the alternator may be limited by the charging capacity of the battery and/or electric power demand of the vehicle accessories, an extra charge storage apparatus may be coupled to the alternator to handle the extra load. For example, one or more capacitors may be coupled to the alternator to store extra charge generated during the pre-boost operation. In other embodiments, one or more additional batteries may be coupled to the alternator.

Enabling the pre-boost also includes retarding spark timing at 316 and advancing intake cam timing at 318. By retarding spark timing, power generated during combustion may be limited so that excess torque and engine speed can be avoided. Additionally, intake cam timing may be advanced to the best volumetric efficiency position during the pre-boost. Because there may be a lag associated with advancing cam timing, advancing during the pre-boost will enable the cam timing to be in the optimal position during a subsequent vehicle launch.

If it is determined at 308 that hydraulic brake pressure has not dropped by a threshold amount, for example if the vehicle is still stopped, or if it is moving without the operator using the brake pedal, method 300 proceeds to 320 to maintain non-pre-boost engine operating parameters. Non-pre-boost operating parameters include opening the wastegate and CBV in response to exhaust pressure at 322. Unlike in the pre-boost mode, the non-pre-boost conditions include allowing the wastegate and CBV to open, dependent upon engine speed and load, exhaust pressure etc., so that air movement through the turbocharger can be controlled to avoid excess boost that can damage engine components.

The non-pre-boost operating parameters also include loading the alternator based on battery charge state and/or accessory component demand at 324. As the alternator converts engine mechanical energy into electrical energy for storage in the battery, the load on the alternator may be based on the current charge state of the battery, and thus may be higher if the battery is low on charge or may be lower if the battery is fully charged. Further, the alternator provides electricity to certain vehicle accessories such as a radio when the charge from the battery is not enough to operate them, and so alternator load may also be based on accessory demand. Similarly, the A/C compressor load may be based on A/C demand at 326.

Non-pre-boost operating parameters include maintaining spark at optimized timing for the current operating conditions at 328. In some embodiments, this may include maintaining spark timing at MBT. Likewise, at 330, the non-pre-boost operating parameters include maintain intake cam timing at the optimized timing for the current operating conditions, which in some embodiments may not include the best volumetric efficiency position.

Figure 4:
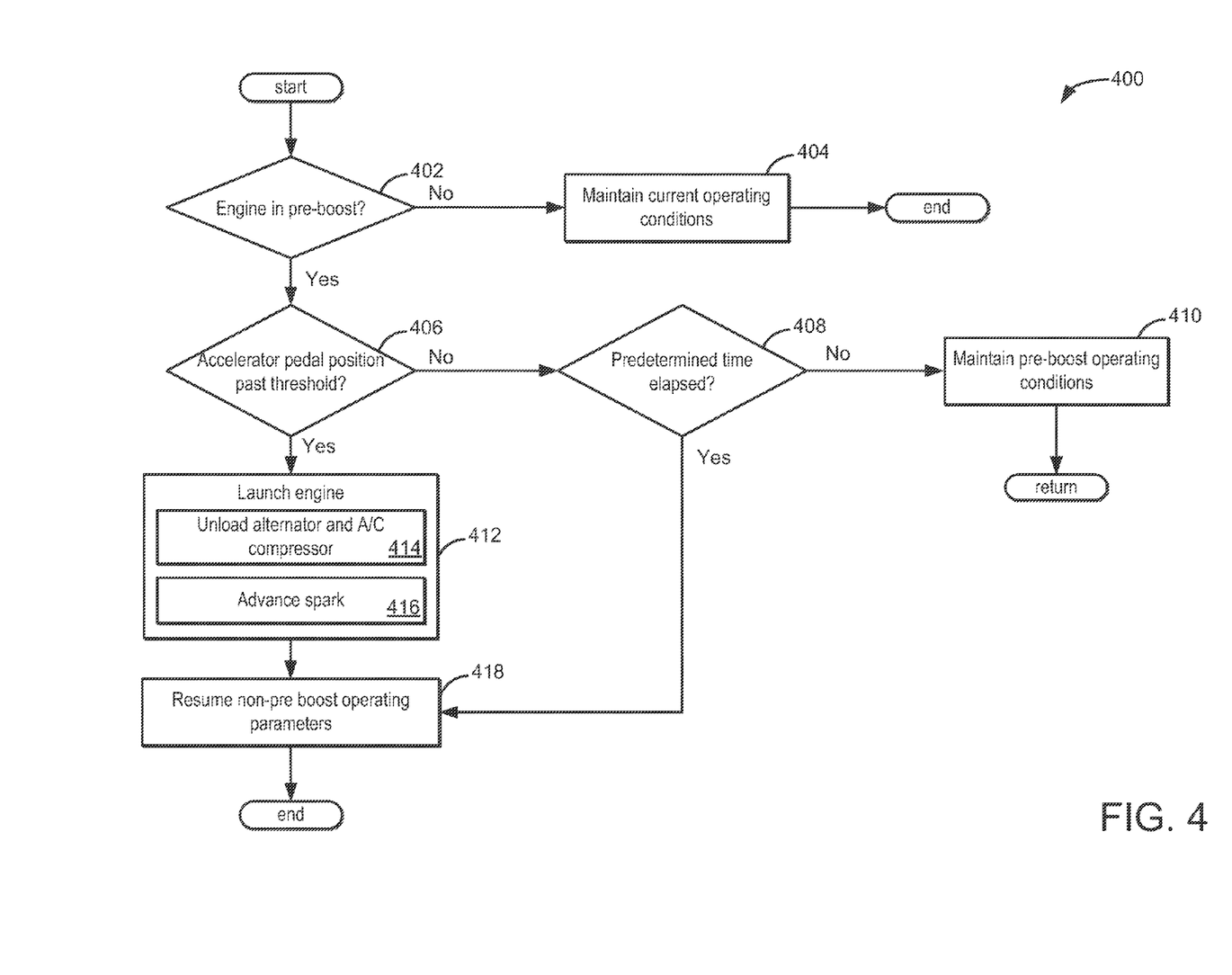
FIG. 4 shows a flow chart illustrating an example method for launching an engine according to an embodiment of the present disclosure.

Thus, method 300 provides for determining if a vehicle may be pre-boosted, and if so, carrying out various actions that enable extra engine boost while limiting engine speed. In some circumstances, following the pre-boost, the vehicle will start to launch whereby an operator of the vehicle will accelerate to launch the vehicle. FIG. 4 depicts a method 400 for launching a vehicle according to an embodiment of the present disclosure. Method 400 may be carried out by controller 12.

Method 400 comprises, at 402, determining if the engine is currently operating in pre-boost, such as the pre-boost conditions described above with respect to FIG. 3. If the answer is no, method 400 proceeds to 404 to maintain the current engine operating parameters, and the method ends. If the answer at 402 is yes, method 400 proceeds to 406 to determine if an accelerator pedal has been depressed past a threshold level. Accelerator pedal position may be determined by sensor 234. The threshold level may be any suitable level that indicates an operator intent to accelerate the vehicle at relatively fast rate, e.g., the threshold position may be depressed by 20%, by 50%, etc. In other embodiments, the threshold pedal position may be any depressed position.

If the accelerator pedal has not been depressed past a threshold level, method 400 proceeds to 408 to determine if a predetermined amount of time has elapsed since the initiation of the pre-boost. The predetermined time may be any suitable time that indicates the operator is not intending to immediately accelerate the vehicle, such as one second, two seconds, etc. If the predetermined time has not elapsed, current engine operating parameters are maintained at 410 in order to continue to operate the vehicle in pre-boost conditions, and the method returns to reassess if the engine is operating in pre-boost and if the pedal position is subsequently depressed. If the predetermined amount of time has elapsed since the pre-boost was initiated, method 400 proceeds to 418 to resume non-pre boost operating parameters, such as those described with respect to FIG. 3, and subsequently exits.

However, if at 406 it is determined that the accelerator pedal position is past the threshold, method 400 proceeds to 412 to launch the vehicle. During the pre-boost, the engine is operated with a number of parameters to increase airflow through the turbine while controlling engine speed. During the launch, the parameters to control engine speed are adjusted so that the vehicle can accelerate. Accordingly, the alternator and A/C compressor are unloaded at 414 and spark timing is advanced at 416. The other operating parameters initiated during the pre-boost, including wastegate and CBV position and intake cam timing, are maintained during the vehicle launch. Following the engine launch, for example, after a predetermined amount of time has elapsed, or after the engine speed steadies, method 400 proceeds to 418 to resume non-pre boost operating parameters. Non-pre-boost operating parameters may include the non-pre-boost operating parameters described above with respect to FIG. 3, and may also include discharging the excess charge stored in the capacitor bank during the pre-boost.

Figure 5A:
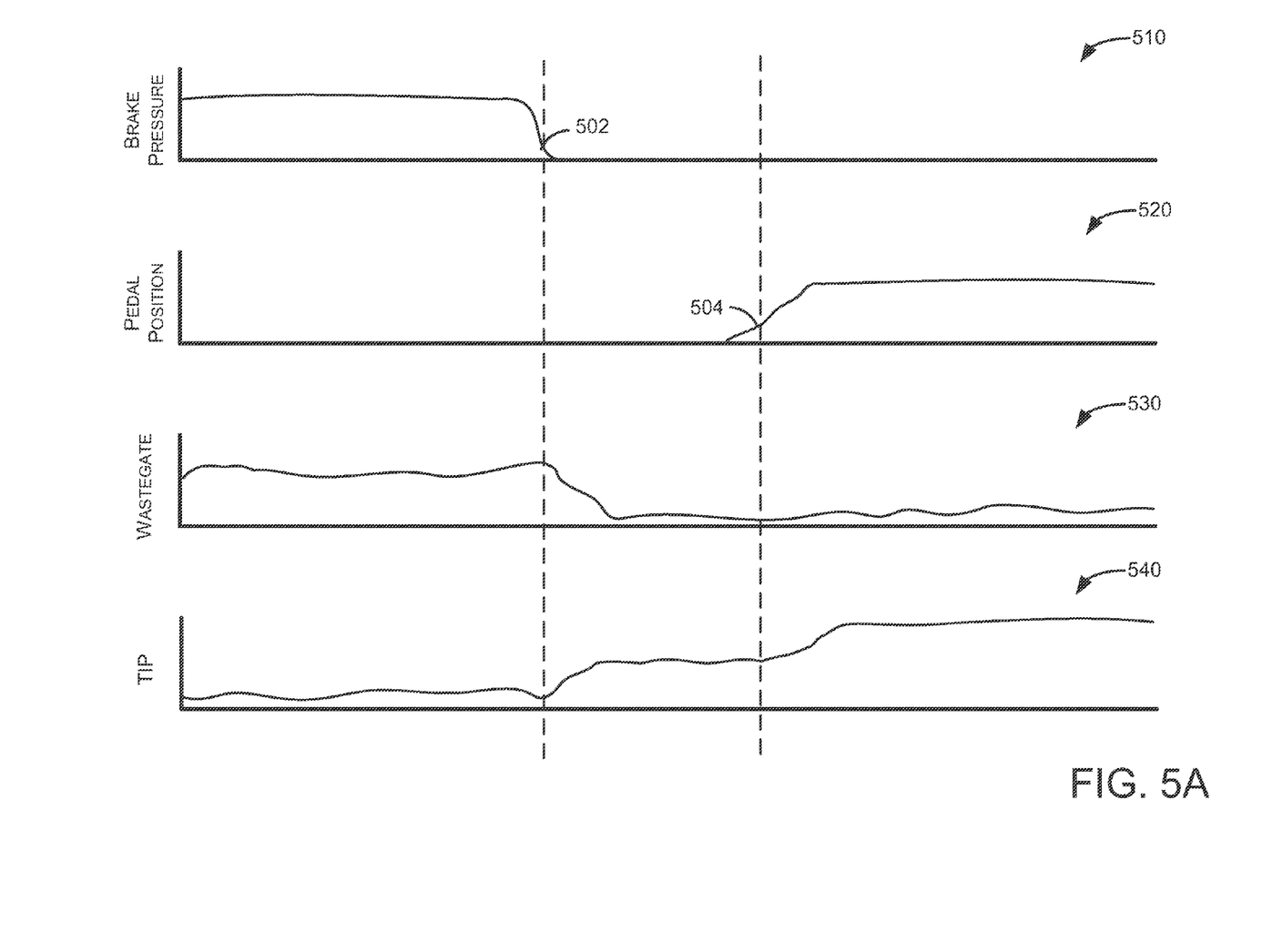
FIGS. 5A and 5B show example engine operating parameter traces according to an embodiment of the present disclosure.
Figure 5B:
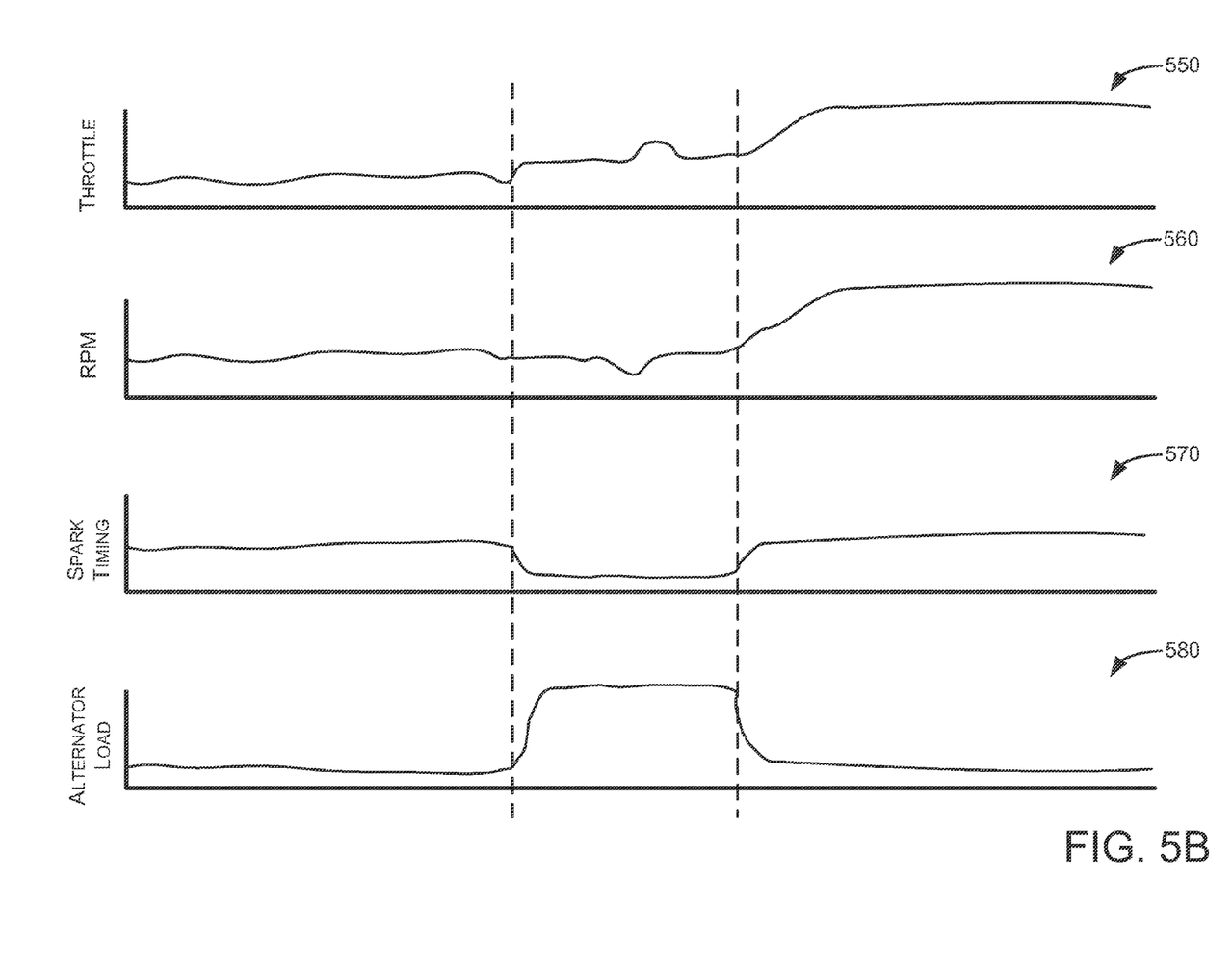

FIGS. 5A and 5B depict example engine operating traces during execution of the above described methods. FIG. 5A illustrates example brake pressure 510, accelerator pedal position 520, wastegate position 530, and throttle inlet pressure 540 traces, while FIG. 5B illustrates example throttle 550, engine speed 560, spark timing 570, and alternator load 580 traces. At the start of the traces, brake pressure is high, indicating the brake is being depressed, and the accelerator pedal position is at zero. Additionally, the engine speed is low, and thus the vehicle is in idle-in-drive, whereby the vehicle is idling while the operating depresses the brake. The wastegate is at its non-pre-boost set point (in this embodiment it is partially open), TIP is low (e.g. at barometric pressure), spark timing is at MBT, and the alternator is operating under low load. At 502, the operator releases the brake and brake pressure drops below a threshold amount. The vehicle then begins the pre-boost by adjusting the set point of the wastegate (and, in some embodiments, the compressor bypass valve, not shown in FIG. 5A or 5B) so that more exhaust is directed to the turbine. Spark timing is retarded, one or more loads are placed on the FEAD (e.g., the alternator load is increased), and the pre-boost is indicated by the increase in the TIP. While the throttle opens some to admit more air into the engine, it remains relatively steady in order to control engine speed.

At 504, the operator depresses the accelerator pedal past a threshold position and the vehicle starts to launch. Accordingly, spark timing is advanced, engine speed increases, the throttle opens, the load placed on the alternator is reduced, and TIP pressure increases. While in the embodiment depicted, the load on the alternator is decreased but yet a small load is still present during the launch, in some embodiments, the load on the alternator may be reduced such that there is no load on the alternator during the launch. In order to increase the TIP, the wastegate (and compressor bypass valve) remains at the restricted set point that it was adjusted to during the pre-boost.

Note that the example control and estimation routines included herein can be used with various engine and/or vehicle system configurations. The specific methods and routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle launch method, comprising:
   during operation with an idle engine speed prior to an accelerator pedal tip-in, increasing alternator load and boost pressure via a turbocharger while maintaining the idle engine speed; and
   responsive to an accelerator pedal tip-in, decreasing alternator load.

2. The method of claim 1, wherein increasing alternator load and boost pressure via the turbocharger while maintaining the idle engine speed are performed in response to a drop in hydraulic brake pressure exceeding a threshold.

3. The method of claim 1, wherein the accelerator pedal tip-in comprises an accelerator pedal being depressed past a threshold level.

4. The method of claim 1, further comprising, during the operation with the idle engine speed prior to the accelerator pedal tip-in, closing a wastegate and compressor bypass valve.

5. The method of claim 1, further comprising, during the operation with the idle engine speed prior to the accelerator pedal tip-in, increasing a load to an air conditioning compressor.

6. The method of claim 5, further comprising, responsive to the accelerator pedal tip-in, decreasing the load on the air conditioning compressor.

7. The method of claim 1, further comprising, during the operation with the idle engine speed prior to the accelerator pedal tip-in, retarding spark timing.

8. The method of claim 7, further comprising, responsive to the accelerator pedal tip-in, advancing spark timing.

9. A method for controlling a vehicle, comprising:
prior to a vehicle launch while at idle engine speed and responsive to catalyst temperature below a temperature that causes damage, in response to a drop in hydraulic brake pressure, increasing boost pressure via a turbocharger above barometric pressure while increasing engine airflow, increasing an engine accessory load, and maintaining idle engine speed; and
launching the vehicle from the idle engine speed in response to an accelerator pedal being depressed past a threshold level by reducing the engine accessory load.

10. The method of claim 9, further comprising advancing intake cam timing prior to the vehicle launch.

11. The method of claim 9, wherein maintaining idle engine speed further comprises retarding spark timing.

12. The method of claim 11, wherein launching the vehicle further comprises advancing spark.

13. The method of claim 9, further comprising closing a wastegate and a compressor bypass valve prior to the vehicle launch.

14. The method of claim 9, wherein increasing the accessory load on the engine further comprises increasing a load placed on an alternator prior to the vehicle launch.

15. The method of claim 14, wherein reducing an accessory load on the engine further comprises decreasing the load placed on the alternator.

16. The method of claim 14, wherein voltage produced as a result of the increased load on the alternator is stored in a capacitor bank coupled to the alternator and wherein the stored voltage is subsequently discharged following the vehicle launch.

17. A vehicle launch method, comprising:
during an idle engine operation:
increasing alternator load and boost pressure via a turbocharger while maintaining idle engine speed;
storing voltage produced as a result of the increased load on the alternator in a capacitor bank coupled to the alternator; and
responsive to an accelerator pedal tip-in from idle engine speed, decreasing alternator load.

18. The method of claim 17, further comprising discharging the stored voltage during engine operation following the accelerator pedal tip-in.

19. The method of claim 17, wherein maintaining the idle engine speed further comprises retarding spark timing.

* * * * *